N. Z. GLENN.
Improvement in Plows.
No. 122,885. Patented Jan. 23, 1872.
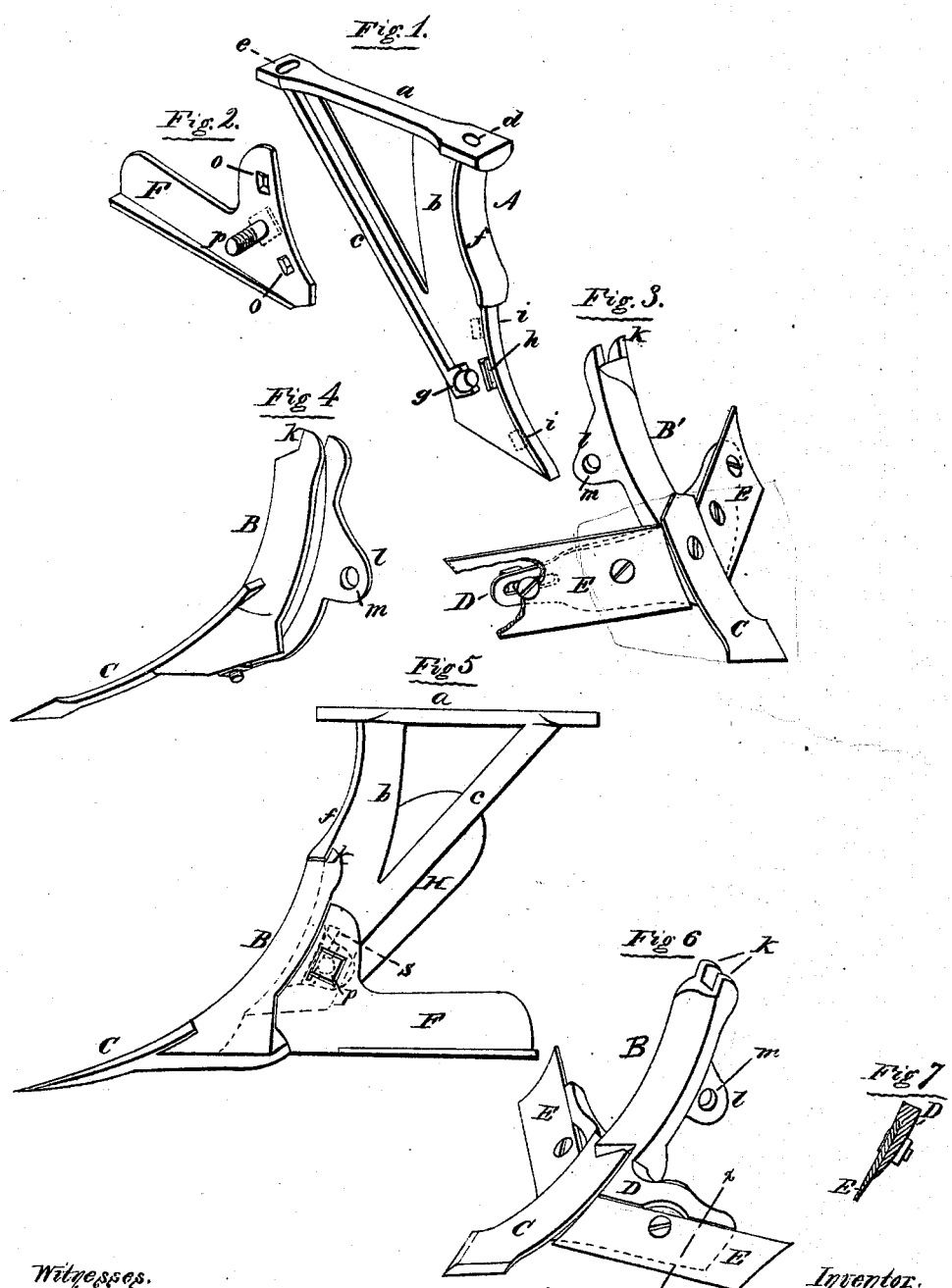
Witnesses.
Harry King.
Phil. T. Dodge
Inventor.
Nicholas Z. Glenn.
by Dodge & Munn
Attys.

UNITED STATES PATENT OFFICE.

NICHOLAS Z. GLENN, OF WATKINSVILLE, GEORGIA.

IMPROVEMENT IN PLOWS.

Specification forming part of Letters Patent No. 122,885, dated January 23, 1872.

SPECIFICATION.

*To all whom it may concern:*

Be it known that I, NICHOLAS Z. GLENN, of Watkinsville, in the county of Clarke and State of Georgia, have invented certain Improvements in Plows, of which the following is a specification, reference being had to the accompanying drawing.

My invention relates to implements used in cultivating cotton, and for similar purposes; and consists in a standard of novel construction to be attached to an ordinary plow-beam, and to which a series of interchangeable mold-boards, shovels, and scrapers are to be attached, by means of which the implement can be transformed into a plow, cultivator, scraper, or other instrument, as required.

Figure 1 is a perspective view of my improved standard. Fig. 2 is a perspective view of the land-side detached. Fig. 3 is a perspective view of one form of a double scraper or shovel. Fig. 4 is a perspective view of the removable point or toe. Fig. 5 is a side view of the standard with land-side, mold-board, and toe attached, the whole forming an ordinary plow. Fig. 6 is a perspective view of another form of double shovel or scraper, and Fig. 7 is a cross-section of the same on the line $x\,x$.

In carrying out my invention I first construct a standard, A, to be attached to the under side of an ordinary plow-beam for the purpose of carrying the mold-board or other cultivating device. This standard is cast in one piece, and consists in a top plate, $a$, an inclined front bar, $b$, and a diagonal brace, $c$, extending from the rear end of the top plate to the lower end of bar $b$. The top plate $a$ is provided with a hole, $d$, in one end, and a slot, $e$, in the other, through which bolts are inserted when it is to be secured in place, the slot allowing it to be adjusted or turned laterally. The front bar $b$ is strengthened by a wide flange, $f$, extending about half way down its front edge, and the brace $c$ by a rib formed on its side; and the brace has its two ends at equal distances from the upper end of bar $b$, so as to receive its entire strain endwise and admit of its being made very light. A hole, $g$, is made through the lower end of the standard, and two small studs, $i$, formed on its side, as shown. Having thus constructed my standard, I provide various mold-boards, shovels, scrapers, and other instruments, and secure each of them to a shank, B', as shown in Fig. 3, these shanks all having their rear sides alike and adapted to fit upon the front of the standard A, but having their front sides of different forms, corresponding with the respective mold-boards, shovels, &c. For instance, Figs. 3 and 6 represent shanks having two lateral arms, D, carrying blades or shovels E, while Fig. 4 shows a shank without arms, carrying only a long toe or point; and Fig. 5, a shank with an ordinary mold-board secured to or cast with it. Each shank B has its rear side grooved so as to fit over the front edge and end of the shank, and has also two lugs, $k$, on the upper end to engage under the flange $f$ of the standard, and a perforated ear, $l$, to receive a fastening-bolt. When my implement is required for any particular use a suitable mold-board, shovel, or other device is selected, and its shank applied to the standard A and secured by passing a bolt, $p$, through its ear and the standard, as shown in Fig. 5. In this manner the shank is held firmly and securely in place on the standard, and the entire strain thrown upon the lugs $k$ and the point of the standard, so that there is no liability of the bolt being broken. A shoulder or stud, $h$, is formed on the standard near the side of the bolt-hole $g$, as in Fig. 1, so that a key or wedge, $s$, may be driven between the bolt and stud, thereby drawing the shank B' back snug against the front of standard A, thus holding it firmly in place, the hole $g$ in the standard A being somewhat larger than the bolt, to allow of sufficient movement of the latter to accomplish this purpose. The upper front face of the standard A, above the shank B', is made with a receding or inward curve, so that masses of grass and weeds accumulating against the front will be loosened by sliding backward off from the upper end of the shank, and thereby allowed to pass off to the side. A land-side, F, is provided, having two recesses in its front end, and a hole through the same, as shown in Fig. 2. When the land-side is required—as, for instance, in connection with a mold-board—for plowing, the front end of the land-side is applied to the side of the standard, as shown in Fig. 5, so that its recesses fit over the lugs $i$ on the latter, and then the bolt $p$ is inserted through the land-side, standard, and shank, as shown in Fig. 5, so as to hold them all together.

The shanks may be provided with right or left hand or double shovels, as desired, with or without the point or toe C in the middle. The shovels or blades E may be attached to the arms D of the shank B' by two screws each, as shown in Fig. 3, and made with two cutting-edges, so that when one becomes dull the blade may be turned over and the other one used; or the arms of the shank may be provided with flanges for the upper edges of the blades to bear against, as shown in Fig. 6, in which case one screw is sufficient to hold each blade. The arms D should be slotted, as shown in Fig. 3, to admit the screws or bolts which hold the shovels, so that when the blades are turned end for end, and that when blades of a different size are applied, the screws will be sure to find an entrance, which would not be the case if simple screw-holes were made in the arms, as the positions of the screws may vary in different shovels. A long flat point or toe, C, may be attached to the shank over the inner ends of the shovels, as shown in Figs. 3 and 6, so as to prevent them from being caught and torn loose by obstructions; but this point may be left off, if desired.

Various other forms and styles of devices besides those shown may be provided, so that by substituting one for another on the standard the implement can be adapted for any required purpose, so that a farmer having a plow with my standard, and a suitable assortment of shovels, mold-boards, and other attachments therefor, can readily adjust the same for any required work, and thus avoid the necessity of purchasing a separate and complete implement for each purpose.

Having thus described my invention, what I claim is—

1. The standard A, consisting of the top plate $a$, having a slot, $e$, at its rear end, the front bar $b$ provided with flange $f$, and the brace $c$, all constructed and arranged substantially as described.

2. The shank B', having its rear side grooved to fit over the front of the standard A, and having lugs $k$ at its upper end to lock under the flange $f$, as herein set forth.

3. The shoulder $h$ arranged by the side of the bolt-hole $g$ of the standard A, in combination with a wedge, $s$, for tightening the parts, as set forth.

4. The shank B', provided with the lateral arms D, having slots therein for receiving and adjusting blades E of various sizes, as set forth.

NICHOLAS Z. GLENN.

Witnesses:
PHIL. T. DODGE,
J. McKENNEY.